US012703446B2

(12) United States Patent
Parrilla Calle

(10) Patent No.: US 12,703,446 B2
(45) Date of Patent: Aug. 11, 2026

(54) MOTOR VEHICLE WITH AT LEAST ONE DRIVE DEVICE AND AT LEAST ONE CABIN WHICH CAN BE ARRANGED ON THE DRIVE DEVICE, AND METHOD

(71) Applicant: Mercedes-Benz Group AG, Stuttgart (DE)

(72) Inventor: Javier Parrilla Calle, Stuttgart (DE)

(73) Assignee: Mercedes-Benz Group AG, Stuttgart (DE)

(*) Notice: Subject to any disclaimer, the term of this patent is extended or adjusted under 35 U.S.C. 154(b) by 624 days.

(21) Appl. No.: 17/908,208

(22) PCT Filed: Feb. 9, 2021

(86) PCT No.: PCT/EP2021/053073
§ 371 (c)(1),
(2) Date: Aug. 30, 2022

(87) PCT Pub. No.: WO2021/175540
PCT Pub. Date: Sep. 10, 2021

(65) Prior Publication Data

US 2023/0128666 A1 Apr. 27, 2023

(30) Foreign Application Priority Data

Mar. 5, 2020 (DE) ..................... 10 2020 001 425.9

(51) Int. Cl.
*B62D 63/02* (2006.01)
*B62D 31/02* (2006.01)

(52) U.S. Cl.
CPC ......... *B62D 63/025* (2013.01); *B62D 31/025* (2013.01)

(58) Field of Classification Search
CPC ............................ B62D 63/025; B62D 31/025
USPC .............................. 296/190.06, 193.04, 35.3
See application file for complete search history.

(56) References Cited

U.S. PATENT DOCUMENTS 6,896,319 B1 * 5/2005 Huang .................. B62D 25/02 296/193.06
8,240,748 B2 * 8/2012 Chapman ............... F41H 7/048 296/205
8,430,196 B2 * 4/2013 Halliday ................. B60K 5/00 89/929

(Continued)

FOREIGN PATENT DOCUMENTS

CN 102285377 A 12/2011
CN 104908829 A 9/2015

(Continued)

OTHER PUBLICATIONS

PCT/EP2021/053073, International Search Report dated May 14, 2021 (Two (2) pages).

*Primary Examiner* — Jason S Morrow
(74) *Attorney, Agent, or Firm* — Crowell & Moring LLP

(57) ABSTRACT

A motor vehicle includes a drive base device which is configured to drive the motor vehicle and a receiving device with a fixing device. The receiving device is configured to receive a first cabin for the motor vehicle and the fixing device is configured to fix the first cabin to the drive base device. The receiving device is configured to receive a second cabin for the motor vehicle, where the second cabin is formed separately from the first cabin, and the fixing device is configured to fix the second cabin to the drive base device.

9 Claims, 6 Drawing Sheets

(56) References Cited

U.S. PATENT DOCUMENTS

| | | | | |
|---|---|---|---|---|
| 10,150,524 | B2 * | 12/2018 | Evans | B62D 47/006 |
| 10,358,173 | B2 | 7/2019 | Gussen et al. | |
| 10,899,240 | B2 * | 1/2021 | Evans | B64D 9/00 |
| 11,554,824 | B2 * | 1/2023 | Lee | B60L 15/32 |
| 11,661,127 | B2 * | 5/2023 | Li | B64F 1/10<br>244/2 |
| 11,673,608 | B2 * | 6/2023 | Yabushita | B62D 33/04<br>280/638 |
| 11,964,607 | B2 * | 4/2024 | Yabushita | B60P 7/13 |
| 11,989,033 | B2 * | 5/2024 | Georgeson | B62D 27/06 |
| 2001/0042996 | A1 * | 11/2001 | Gaspard, II | B61D 3/181<br>296/178 |
| 2018/0237086 | A1 * | 8/2018 | Evans | H02J 7/0042 |
| 2018/0265098 | A1 * | 9/2018 | Evans | B64U 30/20 |
| 2019/0202377 | A1 * | 7/2019 | Mizutani | B62D 31/025 |
| 2020/0369334 | A1 * | 11/2020 | Lee | B60K 1/04 |
| 2021/0129909 | A1 * | 5/2021 | Yabushita | B62D 39/00 |
| 2021/0284201 | A1 * | 9/2021 | Harada | B60W 60/0024 |
| 2025/0019020 | A1 * | 1/2025 | Lee | B62D 33/077 |

FOREIGN PATENT DOCUMENTS

| | | | |
|---|---|---|---|
| CN | 106908829 | A | 6/2017 |
| DE | 20 2016 004 708 | U1 | 11/2016 |
| DE | 10 2016 215 405 | A1 | 2/2018 |
| EP | 2 921 406 | A1 | 9/2015 |
| EP | 3 321 112 | A1 | 5/2018 |
| EP | 3 533 691 | A1 | 9/2019 |
| WO | WO 2007/013164 | A1 | 2/2007 |
| WO | WO 2019/081096 | A1 | 5/2019 |

* cited by examiner

MOTOR VEHICLE WITH AT LEAST ONE DRIVE DEVICE AND AT LEAST ONE CABIN WHICH CAN BE ARRANGED ON THE DRIVE DEVICE, AND METHOD

BACKGROUND AND SUMMARY OF THE INVENTION

The invention relates to a motor vehicle with at least one drive base device. The invention also relates to a method.

For example, it is already known from the aviation sector that seats for passengers of the aircraft can be separated so that the greatest possible comfort for a single passenger can be achieved. In particular, the privacy of the passenger can be increased. Furthermore, motor vehicles are already known which can receive different cabins so that, for example, a cabin for passengers or a cabin for cargo can be mounted on a drive base device of the motor vehicle.

WO 2007/013164 A1 discloses a bus which is easily formable by modification even in conventional high-decker buses and the other single-decker buses used as long-distance night buses, and is capable of securing sufficient aisle space without reducing the number of seats, and in particular can secure privacy by sufficiently separating the seats from each other so that habitability is provided, and uses a seat cell for the bus. The bus is characterized in that the seats are arranged in a cabin, in that the seats are arranged by storing seat cells forming compartments, and in that the plurality of seat cells are combined with each other to form compartment groups in the cabin.

EP 3 321 112 A1 discloses a passenger transport system comprising a non-propelled, non-wheeled passenger module having at least one passenger seat, a first drive module configured to travel autonomously on the ground, and a second drive module configured to travel autonomously in the air, wherein the passenger module is arranged such that it can be releasably coupled to the first drive module and the second drive module to allow the passenger module to be transported on the ground or in the air by the first drive module or the second drive module.

DE 10 2016 215 405 A1 discloses a device for dividing cabins and/or load compartments, in particular of vehicles, into a number of subsections, comprising a number of deformable walls, and a drive unit with which the walls are movable between an open position, in which the walls do not divide the cabin and/or the load compartment, and a closed position, in which the walls divide the cabin and/or the load compartment into subsections, wherein the walls are deformed when moving between the closed position and the open position.

The object of the present invention is to provide a motor vehicle and a method by means of which the motor vehicle can be used more advantageously.

One aspect of the invention relates to a motor vehicle with at least one drive base device, which is configured to drive the motor vehicle, and with at least one receiving device, which is configured to receive at least a first cabin for the motor vehicle and to fix it to the drive base device by means of a fixing device of the receiving device.

It is provided that the receiving device is configured to receive at least a second cabin, which is formed separately from the first cabin, wherein the fixing device is configured to additionally fix the second cabin to the drive base device.

This allows the motor vehicle to be used advantageously. In particular, the motor vehicle can provide so-called car sharing, wherein different cabins are used to be arranged on the motor vehicle, so that a single cabin can be available for each individual user of the cabin. This can increase the privacy for a user.

In other words, it is particularly provided that the first cabin and/or the second cabin can be detachably arranged on the drive base device. The first and/or the second cabin are formed without a drive. In particular, a plug-in system which is flexibly configured can be provided on the basis of the receiving device, the fixing device and the cabins. In particular, a modular system can thus also be formed, wherein the drive base device is formed as a base for arranging different and several cabins.

For example, the first cabin can be configured for a user or a passenger of the motor vehicle. A passenger cabin can thus be provided. The second cabin can likewise be provided as a passenger cabin. Alternatively, the first cabin and/or the second cabin can be provided as a cabin for an object, for example for luggage. This makes it possible, for example, for the first cabin to be provided for the user and the second cabin to be provided for an object. This separates the object from the user, for example. Improved privacy can thus be created for the user. For example, if the object is a pet, the user can thus be separated from olfactory disturbances of the pet as well as from sounds of the pet. Thus, an increase in comfort for the user can be achieved. Furthermore, different objects can be arranged in the different cabins, which, for example, must not be brought together due to chemical properties.

It is also possible for the cabins to have different safety requirements. For example, the first cabin can be a fireproof cabin but without air conditioning and restraint system, while the second cabin is provided with appropriate safety measures for users so that, for example, shattering of the glass is made more difficult or that appropriate restraint systems are provided for passengers in this cabin. In this way, the safety for the user in the second cabin can be increased, while the fire resistance for the object in the first cabin is increased. Thus, different cabins can be provided at a reduced cost and effort.

Furthermore, the separation of the cabins makes it possible in particular, for example, for one user to sleep quietly in one cabin while the other user works in the second cabin. Furthermore, the passengers can be transported separately from each other, so that the safety for passengers can be increased, since, for example, no theft can be carried out by one user on the other user. This can further increase the willingness of users to engage in car sharing.

Furthermore, it is possible to remove the cabin from the motor vehicle and, for example, to clean it. In this way, the motor vehicle can continue to transport people, while only the cabin is separated from the motor vehicle and can be cleaned or, for example, repaired. This allows improved use of the motor vehicle, as only the cabins need to be replaced in order to clean or repair them, for example, without having to remove the drive base device from circulation.

In particular, it can be provided that, for example, additional possibilities for stowing luggage are arranged on the drive base device. These additional stowage options are in particular fixed and thus cannot be detached without causing damage, but can also be detachably arranged on the drive base device.

The first cabin and the second cabin can, for example, pick up the cabins by means of a crane device or a lifting device on the drive base device. Alternatively, the cabins can also be stored at a central warehouse and, depending on the situation, can be placed on the drive base device by appropriate lifting equipment in the central warehouse. This list of possible set-ups is purely exemplary and by no means to be regarded as conclusive.

The first cabin and the second cabin are in particular formed in such a way that they can also be arranged in a highly flexible manner on receiving devices of further drive base devices.

The drive base device can in particular have an at least partially electric drive, for example in the form of a hybrid drive, for driving. Preferably, the drive base device is configured to drive the motor vehicle with an all-electric drive device. However, the drive base device may also have an internal combustion engine or a fuel cell as a drive device.

According to an advantageous embodiment, the motor vehicle is configured as a fully autonomous motor vehicle. In other words, the motor vehicle is moved fully autonomously. In particular, the drive base device has, for this purpose, at least one longitudinal acceleration device and one transverse acceleration device, by means of which the motor vehicle can be operated fully autonomously. The users are thus merely passengers who enter the first cabin and/or the second cabin and can then be transported autonomously by the motor vehicle. The feature that the vehicle can drive autonomously shall be understood to mean that the vehicle can drive autonomously according to SAE autonomy level 3 or higher, i.e., 3, 4 or 5 (SAE—Society of Automotive Engineers). Level 3 or SAE autonomy level 3 means conditional automation and the driving mode-specific execution of all aspects of the dynamic driving task by an automated driving system with the expectation that the human driver will respond appropriately to the system's request. Level 4 or SAE autonomy level 4 means high automation and driving mode-specific execution of all aspects of the dynamic driving task by an automated driving system, even if the human driver does not respond appropriately to the system's request. Level 5, or SAE autonomy level 5, means full automation, with an automated driving system consistently executing all aspects of the dynamic driving task that can be handled by a human driver under all driving and environmental conditions.

Furthermore, it has proven to be advantageous if the first cabin has a separating device which is configured to divide the first cabin into two separate compartments, and/or the second cabin has a separating device which is configured to divide the second cabin into two separate compartments, and/or the first cabin and the second cabin each have a connecting device which is configured to connect the first cabin to the second cabin in such a way that a common interior space is formed. For example, it can be provided that the first cabin is configured for two seated persons or one reclining person. If, for example, the motor vehicle is in daytime driving mode, wherein it can be assumed hereby that the persons only want to sit, the separating device in the first cabin can be "raised" accordingly so that two separate compartments can be provided for two different users. In particular, the separating device can be made of movable elements, such as lightweight partitions, so that they can be separated or connected. If, for example, the motor vehicle is to be driven at night, the separating device can be lowered and, for example, a bed can be provided in the cabin for one person, which can be spread over two seats. Alternatively, this can be provided for the second cabin. Again alternatively or additionally, the first cabin can be connected to the second cabin via a connecting device, which for example are also configured as movable walls of the first cabin and the second cabin, so that, for example, friendly persons can ride in the common interior. This creates a highly flexible possibility to configure the motor vehicle for different people and different scenarios.

Furthermore, it has proven to be advantageous if at least one of the cabins is configured to accommodate a person and/or at least one of the cabins is configured to accommodate the object. In particular, the motor vehicle can thus transport both persons and objects. For example, the cabin for accommodating persons may be able to accommodate the person both sitting and lying down. The cabin for receiving an object can in particular be configured as a transport cabin, which also makes it possible to transport different objects by means of the motor vehicle. Thus, the motor vehicle can be used depending on the situation, whereby a highly flexible variant for car sharing is proposed.

Furthermore, it has proven to be advantageous if the first cabin and the second cabin have separate functional units for operating the relevant cabin. For example, the first cabin and the second cabin can each have an air-conditioning unit as a functional unit. The air-conditioning devices are then controllable independently of each other. Thus, a first temperature can be set in the first cabin and a different second temperature can be set in the second cabin. For example, there might also be no temperature control when the cabin is not in use, so that energy can be saved. Alternatively, different media devices can be provided as functional units, for example, which can then be controlled differently. In particular, it can be provided, for example, that if one of the cabins is not occupied, the corresponding functional units can be switched off so that energy can be saved within the motor vehicle.

It is further advantageous if the receiving device is configured to receive at least three, in particular at least four, separate cabins. In particular, this allows the motor vehicle to be used in a highly flexible manner. For example, two seated persons in one individual cabin each and one reclining person in a larger cabin can be accommodated by the receiving device. Alternatively, four seated persons can be accommodated and/or only two seated persons can be accommodated and/or only two reclining persons can be accommodated and/or two seated persons and their luggage can be accommodated. This allows the motor vehicle to be used in a highly flexible manner. In particular, in the case of a larger motor vehicle, in particular in the case of a larger drive base device, it may also be possible for more than four separate cabins to be arranged on the motor vehicle.

In a further advantageous embodiment, the cabins are provided independently of the drive device and are configured to be flexibly arranged on the drive device. In particular, the cabins can be owned by the user, for example, and can be quickly plugged in to the motor vehicle, which can be done by means of a plug-in process, for example. In particular, the cabins are single, completely or partially enclosed regions. In particular, car sharing of the motor vehicle can thus be used, wherein the users do not enter a common interior space, but are accommodated via separate cabins on the motor vehicle.

A further aspect of the invention relates to a method for operating a motor vehicle, in which the motor vehicle is driven by at least one drive device of the motor vehicle, and in which at least one first cabin for the motor vehicle is received by at least one receiving device and is fixed to the drive device by means of a fixing device of the receiving device.

It is provided that a second cabin is received by means of the receiving device and is formed separately from the first cabin, wherein the second cabin is additionally fixed to the drive base device by means of the fixing device.

According to an advantageous embodiment of the method, the first cabin and/or the second cabin are flexibly arranged on the receiving device.

Furthermore, it has proven to be advantageous if cabins of different configuration are arranged on the receiving device. In particular, transport cabins can be combined with passenger cabins.

Advantageous embodiments of the motor vehicle are to be regarded as advantageous embodiments of the method. For this purpose, the motor vehicle has device features which allow the method or an advantageous form thereof to be carried out.

Further advantages, features and details of the invention will become apparent from the following description of preferred exemplary embodiments and on the basis of the drawings. The features and combinations of features mentioned above in the description as well as the features and combinations of features mentioned below in the figure description and/or shown alone in the figures can be used not only in the combination indicated in each case, but also in other combinations or on their own, without departing from the scope of the invention.

DETAILED DESCRIPTION OF THE DRAWINGS

In the figures, like or functionally like elements are provided with like reference signs.

Figure 1:
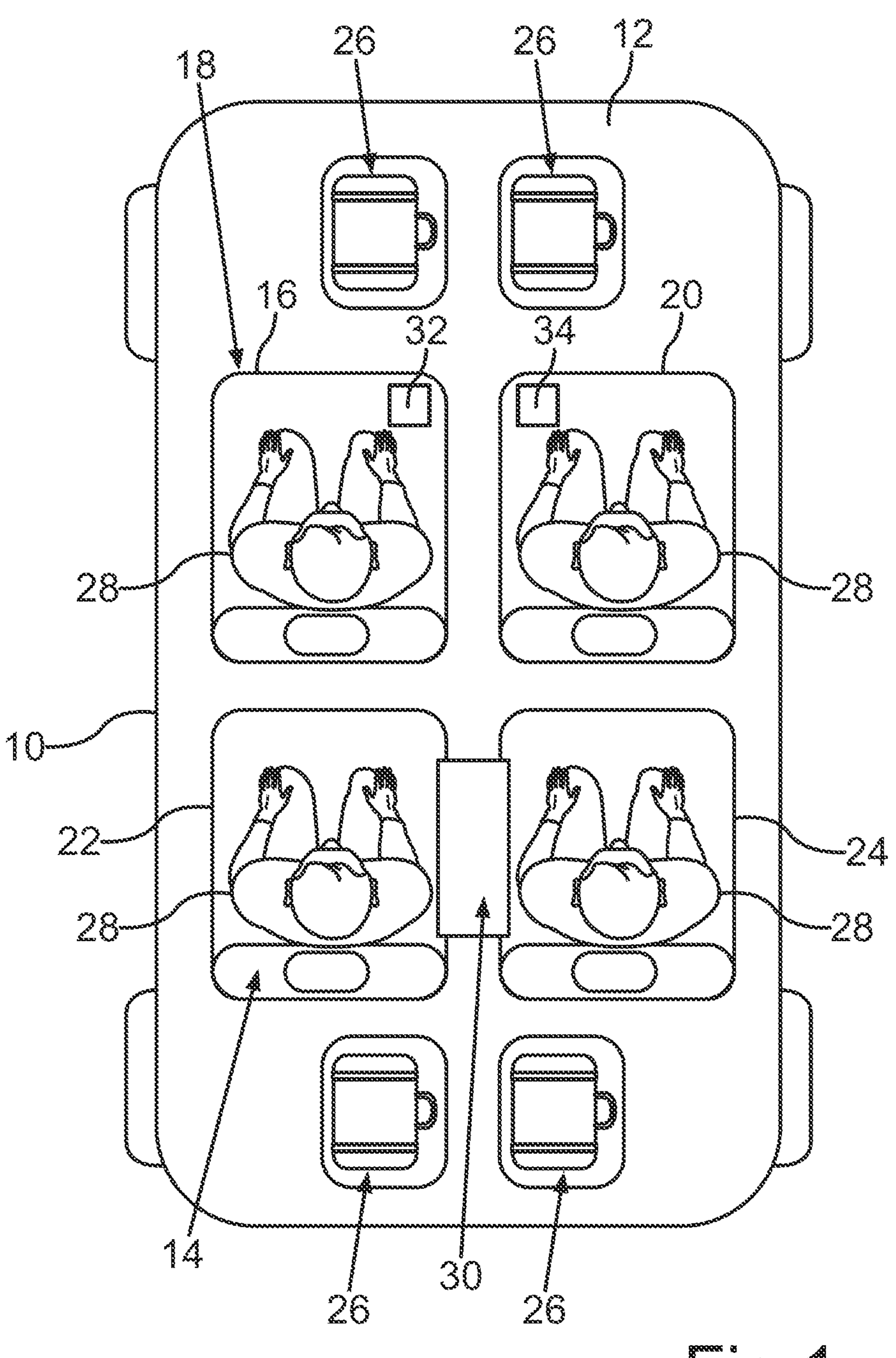
FIG. 1 shows a schematic plan view of an embodiment of a motor vehicle.

FIG. 1 shows a schematic plan view of an embodiment of a motor vehicle 10. The motor vehicle 10 has a drive base device 12. The drive base device 12 is configured to drive the motor vehicle 10. Furthermore, the motor vehicle 10 has a receiving device 14 which is configured to receive at least a first cabin 16 for the motor vehicle 10 and to fix it to the drive base device 12 by means of a fixing device 18 of the receiving device 14.

It is provided that the receiving device 14 is configured to receive at least a second cabin 20, which is formed separately from the first cabin 16, wherein the fixing device 18 is configured to additionally fix the second cabin 20 to the drive base device 12.

In particular, the first cabin 16 and the second cabin 20 are thus arranged or can be arranged on a single common receiving device 14.

In particular, FIG. 1 shows that the receiving device 14 is configured to receive at least three, in particular at least four, separate cabins 16, 20, 22, 24. In the present exemplary embodiment, four separate cabins 16, 20, 22, 24 are thus arranged on the drive base device 12.

Furthermore, FIG. 1 shows that luggage cabins 26 in particular can be formed on the drive base device 12, which are separate from the cabins 16, 20, 22, 24 and are configured, for example, to accommodate luggage of occupants or passengers 28.

The cabins 16, 20, 22, 24 are in particular non-destructively detachably arranged on the drive base device 12. In other words, they can be removed from the drive base device 12 and arranged, for example, on other drive base devices or on the drive base device 12.

FIG. 1 further shows that the first cabin 16 and the second cabin 20 can each have a connecting device 30, which is configured to connect the first cabin 16 to the second cabin 20 in such a way that a common interior space is formed. In particular, in the present exemplary embodiment, a third cabin 20 is connected to a fourth cabin 24 by means of the connecting device 30. In other words, the first cabin 16 is separate and the second cabin 20 is presently separate. The third cabin 22 and the fourth cabin 24 are connected to each other via the connecting device 30 and form the common interior space. Alternatively or additionally, it can be provided that the first cabin 16 has a separating device which is configured to divide the first cabin 16 into two separate compartments, and/or the second cabin 20 has a separating device which is configured to divide the second cabin 20 into two separate compartments.

Furthermore, it can be provided in particular that the first cabin 16 and the second cabin 20 have separate functional units 32, 34 for operating the relevant cabin 16, 20. For example, a first functional unit 32 can be assigned to the first cabin 16 and a second functional unit 34 can be assigned to the second cabin 20. The functional units 32, 34 may, for example, be air-conditioning units so that the corresponding cabins 16, 20 may be air-conditioned differently. Furthermore, it can be provided, for example, that if one of the cabins 16, 20, 22, 24 is not occupied, it cannot be air-conditioned, whereby energy can be saved. Furthermore, unoccupied cabins 16, 20, 22, 24 can be cleaned or repaired, for example. They can be removed for this purpose or can remain on the drive base device. This can be carried out in particular during driving operation of the motor vehicle 10, so that repair or cleaning work can still be carried out even when the motor vehicle 10 is at least partially occupied. Thus, an improved use of the motor vehicle 10 can be achieved. In particular, improved car sharing can thus be provided, whereby in particular the acceptance of passengers 28 for car sharing can be increased.

In particular, it may be provided that the motor vehicle 10 is configured as a fully autonomous motor vehicle 10. In other words, the motor vehicle 10 has corresponding longitudinal acceleration devices and transverse acceleration devices so that fully autonomous operation of the motor vehicle 10 can be achieved. In particular, the motor vehicle 10 can then be provided for so-called car sharing, wherein the persons do not enter a common interior space, but are arranged on the motor vehicle 10 by means of their own, individual cabins 16, 20, 22, 24.

Figure 2:
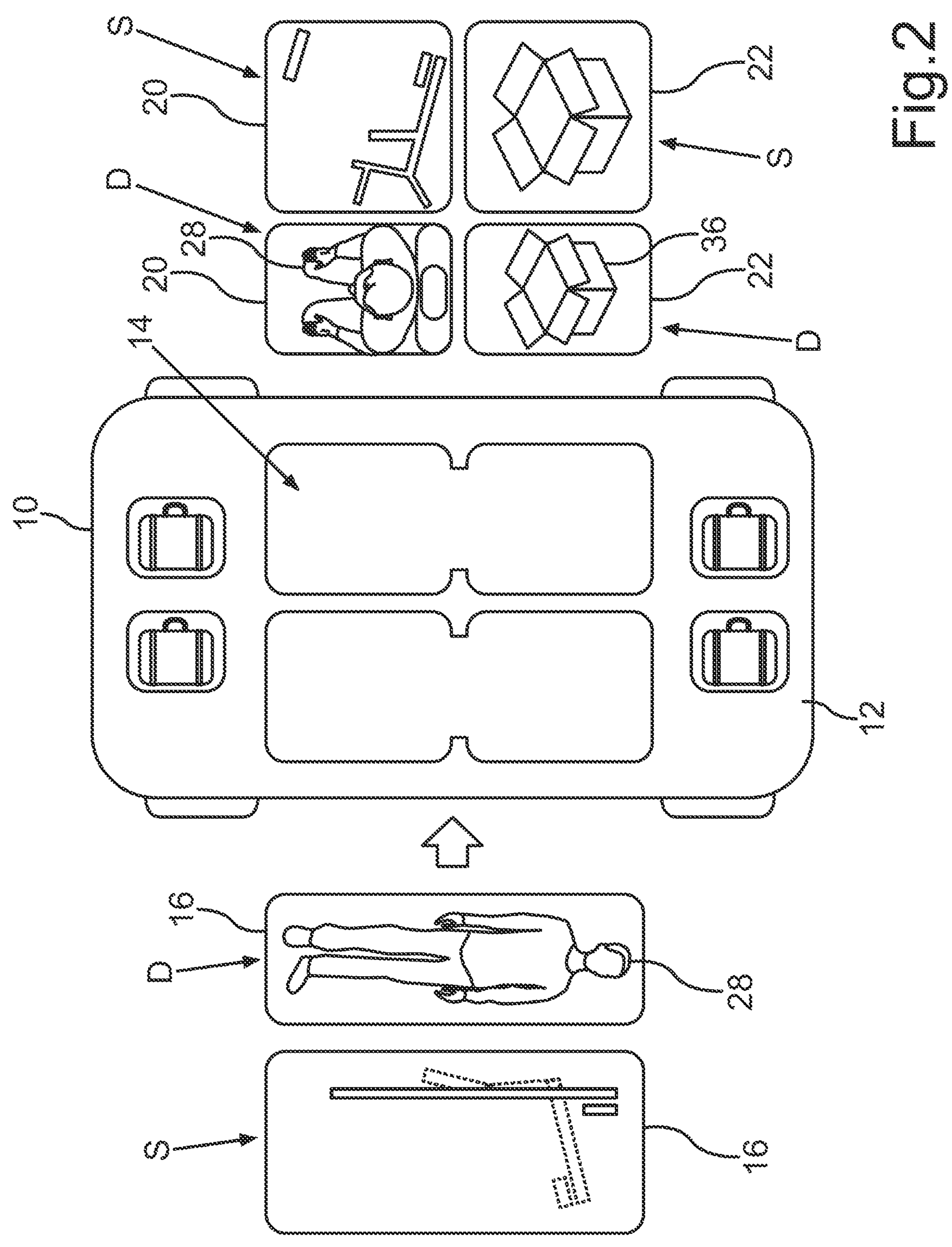
FIG. 2 shows a further schematic plan view of an embodiment of the motor vehicle.

FIG. 2 shows a further schematic plan view of the motor vehicle 10 according to a further embodiment. In the present exemplary embodiment, the cabins 16, 20, 22, 24 are not arranged on the motor vehicle 10. In other words, the receiving device 14 of the motor vehicle 10 is shown. In particular, it is shown that at least one of the cabins 16, 20, 22, 24 is configured to receive a person, in particular the passenger 28, and/or at least one of the cabins 16, 20, 22, 24 is configured to receive an object 36.

FIG. 2 shows in particular the cabins 16, 20, 22, 24 both in a plan view D and in a side view S.

In the following exemplary embodiment, the first cabin 16 in particular is configured as a reclining cabin for the passenger 28. The second cabin 20 is configured in particular as a passenger cabin, wherein the passenger 28 is transported in a seated position. The third cabin 22 is configured as a transport cabin so that the object 36 can be arranged there.

The cabins 16, 20, 22, 24 can be plugged in on the motor vehicle 10, in particular for car sharing or as an individual's property. The cabins 16, 20, 22, 24 are individual, completely or partially enclosed areas. These can be combined with each other so that, for example, a cabin transporter motor vehicle 10 can also be provided, whereby a high efficiency in transport and/or passenger transport can be achieved.

In particular, it may further be provided that the cabins 16, 20, 22, 24 are provided independently of the drive base device 12 and are configured to be flexibly arranged on the drive base device 12 and on further drive base devices. Thus, a kind of modular system can be provided so that a reliable and highly flexible car sharing of the motor vehicle 10 can be realised.

Figure 3:
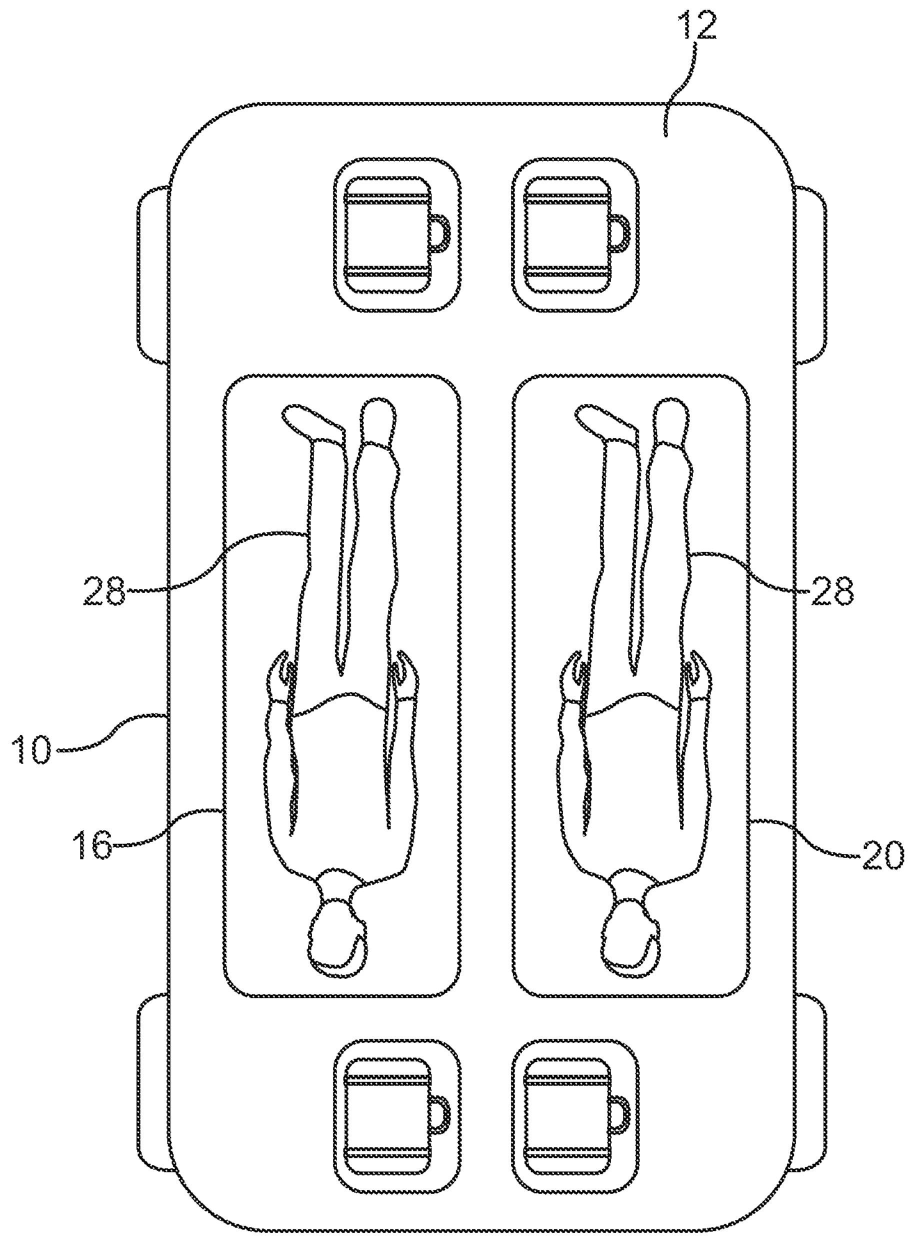
FIG. 3 shows a further schematic plan view of an embodiment of the motor vehicle.

FIG. 3 shows a schematic plan view of the motor vehicle 10 with the drive base device 12 according to a further embodiment. In the present exemplary embodiment, in particular the first cabin 16 and the second cabin 20 are arranged on the receiving device 14. In the present case, the first cabin 16 and the second cabin 20 are provided as reclining cabins, so that two passengers 28 can be transported in a reclining position by the motor vehicle 10. For example, it can be provided that the motor vehicle 10, which is operated in particular fully autonomously, is provided during night-time operation, so that the passengers 28 can sleep in their respective cabins 16, 20.

Figure 4:
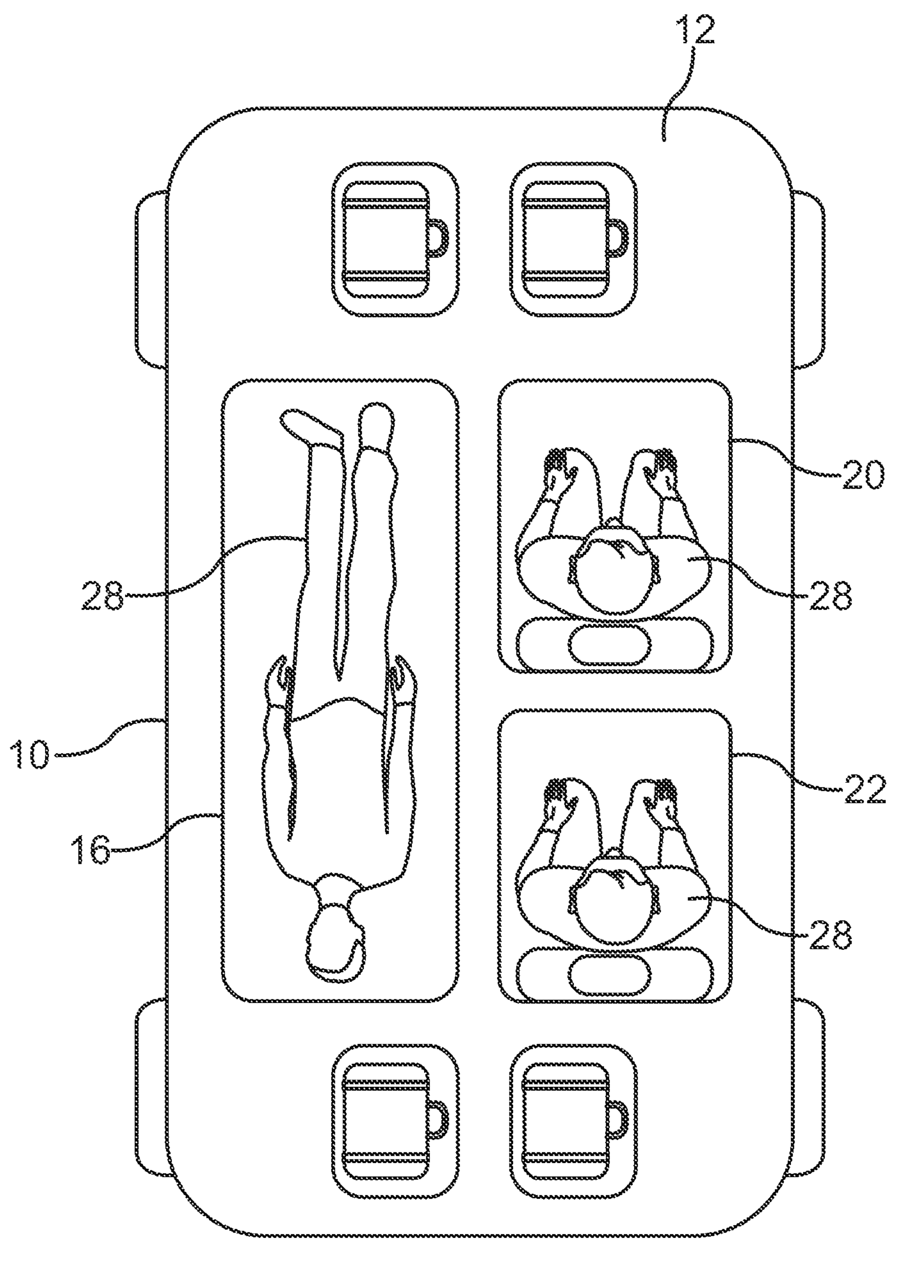
FIG. 4 shows a further schematic plan view of an embodiment of the motor vehicle.

FIG. 4 shows a further embodiment of the motor vehicle 10 with the drive base device 12, for example at a different time than shown in FIG. 3. For example, the passenger 28 may sleep in the first cabin 16, while the second cabin 20 and the third cabin 22 are formed adjacently to the first cabin 16 and in which corresponding passengers 28 are seated. Thus, three cabins 16, 20, 22, 24 can be provided, wherein one of them is configured for a sleeping passenger 28 and two further cabins 16, 20, 22, 24 are configured for seated passengers 28. In this way, the motor vehicle 10 can be provided in a highly flexible manner for different needs of the passengers 28.

Figure 5:
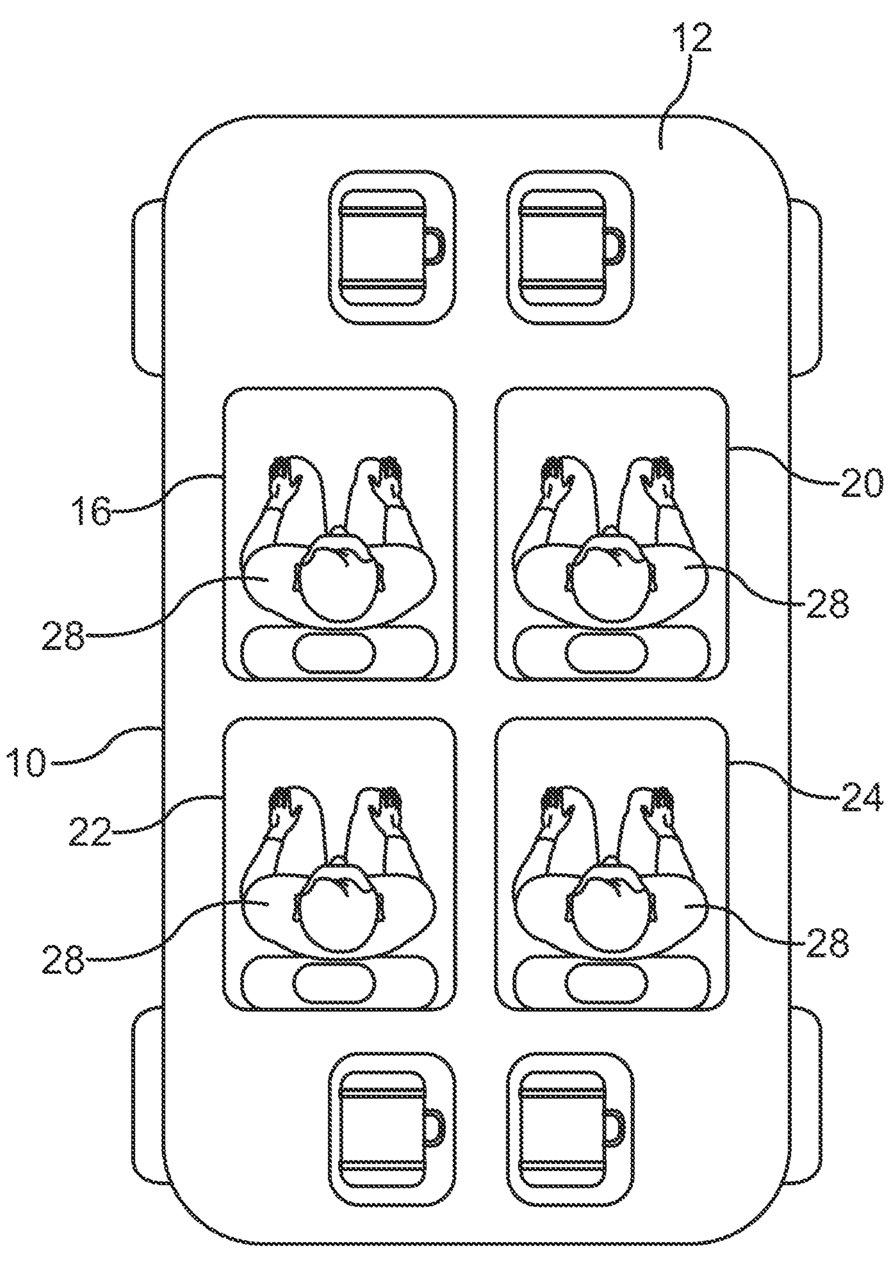
FIG. 5 shows a further schematic plan view of an embodiment of the motor vehicle.

FIG. 5 shows a further schematic plan view of the motor vehicle 10 with the drive base device 12 in a further situation. For example, daytime operation for carrying passengers 28 can be shown in the present configuration. In particular, the first cabin 16, the second cabin 20, the third cabin 22 and the fourth cabin 24 are arranged on the drive base device 12 in the present case. Thus, a maximum capacity utilisation for the transport of passengers 28 can be achieved.

The invention also relates to a method for operating the motor vehicle 10, in which the motor vehicle 10 is driven with at least the drive base device 12 of the motor vehicle 10, and in which at least the first cabin 16 for the motor vehicle 10 is received at least by means of the receiving device 14 and is fixed to the drive base device 12 by means of the fixing device 18 of the receiving device 14. It is provided that, by means of the receiving device 14, the second cabin 20 is received, which is formed separately from the first cabin 16, wherein, by means of the fixing device 18, the second cabin 20 is additionally fixed to the drive base device 12.

In particular, it can be provided here that the first cabin 16 and/or the second cabin 20 are flexibly arranged on the receiving device 14. Furthermore, it can be provided in particular that differently configured cabins 16, 20, 22, 24 are arranged on the receiving device 14.

Figure 6:
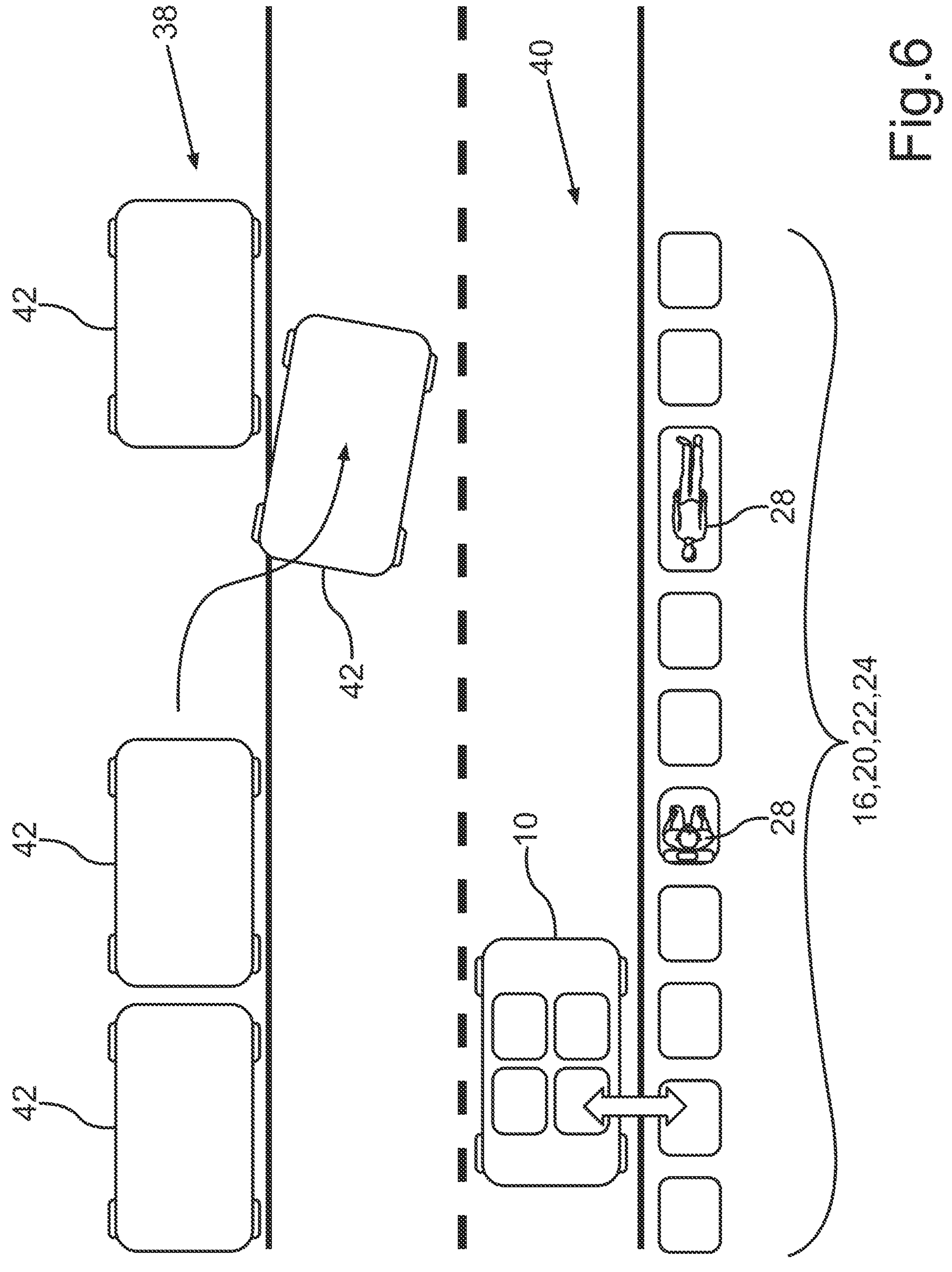
FIG. 6 shows a schematic plan view of an embodiment in accordance with the method according to the invention.

FIG. 6 shows a schematic plan view of an embodiment of the method. In particular, a separation is shown by the dashed line between the current prior art, which is represented by an arrow 38, and the concept according to the invention, which is represented by the arrow 40. In other words, the arrow 38 shows a method according to the prior art and the arrow 40 shows a method according to the invention, wherein these are separated visually by the dashed line.

FIG. 6 shows that the cabins 16, 20, 22, 24 are individual independent elements that can be parked in garages or at the roadside, for example. The passengers 28 can, for example, already be seated in the cabins 16, 20, 22, 24 while waiting for the motor vehicle 10 at the roadside, so that none of the passengers 28 is cold, for example. The space for parking the cabins 16, 20, 22, 24 is significantly smaller compared to the motor vehicles 42 according to the prior art, so that space can be saved here, especially in cities.

In particular, it can be provided that, for example, a central system for management of the cabins 16, 20, 22, 24 is provided in order to organise the transport efficiently. If, for example, a passenger 28 wishes to travel from a first location to a fourth location and a second passenger 28 wishes to travel from a second location to the fourth location, it can be implemented by means of the vehicle management system, for example, that a first motor vehicle 10 travels from the first location to a third location, which is formed between the first location and the fourth location and between the second location and the fourth location, and in doing so picks up a passenger 28. A second motor vehicle 10 also travels from the second location to the third location. At the third location, an exchange of cabins 16, 20, 22, 24 then takes place without the need for a direct passenger transfer. For example, the cabin 16, 20, 22, 24 from the second motor vehicle 10 can now be arranged on the first motor vehicle 10. In other words, only one of two motor vehicles 10 is required at the third location since the cabins 16, 20, 22, 24 have been brought together. The first motor vehicle 10 then travels from the third location to the fourth location with the two cabins 16, 20, 22, 24 with the two passengers 28. In particular, the first motor vehicle 10 then has the two passengers 28 from the third location to the fourth location. This enables the highly flexible use of different motor vehicles 10, wherein an energy saving and a better $CO_2$ balance can also be achieved, since, for example, only one motor vehicle 10 travels from the third location to the fourth location.

The motor vehicle 10 according to the invention can in particular prevent the theft of components in the motor vehicle 10, as these are individually separated from each other. Furthermore, the upholstery/cushioning, covers, for example, can be replaced more often as a result of maintenance. Furthermore, antibacterial surfaces can be provided. Empty assembly spaces are difficult to access, so there is no danger of hidden fuels or bombs, for example. Furthermore, misuse by customers can be expected, and therefore a higher strength for the safety factors of the components must be provided. Furthermore, a finger pinching hazard should be avoided.

Overall, the invention shows a mobility of the future, in particular a concept for autonomous car sharing.

The invention claimed is:

1. A motor vehicle, comprising:

a drive base device which has a planar upper surface and which is configured to drive the motor vehicle; and a single common receiving device, wherein the single common receiving device is disposed on the planar upper surface of the drive base device and wherein the single common receiving device is a planar structure and is configured to receive a first cabin for the motor vehicle such that the first cabin is disposed on the single common receiving device and not in contact with the planar upper support surface of the drive base device;

wherein the single common receiving device is configured to receive a second cabin for the motor vehicle, wherein the second cabin is formed separately from the first cabin, and wherein the first cabin and the second cabin are each flexibly laterally and longitudinally arrangeable on the single common receiving device and are disposed laterally adjacent to one another on the motor vehicle.

2. The motor vehicle according to claim 1, wherein the motor vehicle is a fully autonomous motor vehicle.

3. The motor vehicle according to claim 1, wherein the first cabin is divided into two separate compartments and/or wherein the second cabin is divided into two separate compartments and/or wherein the first cabin and the second cabin are connected to each other such that a common interior space is formed.

4. The motor vehicle according to claim 1, wherein at least one of the first cabin and the second cabin is configured to accommodate a person and/or wherein at least one of the first cabin and the second cabin is configured to accommodate an object.

5. The motor vehicle according to claim 1, wherein the first cabin has a first functional unit for operating the first cabin and wherein the second cabin has a second functional unit for operating the second cabin.

6. The motor vehicle according to claim 1, wherein the single common receiving device is configured to receive a third cabin and a fourth cabin, wherein the third cabin and the fourth cabin are formed separately from the first cabin and the second cabin, and wherein the third cabin and the fourth cabin are disposed longitudinally behind the first cabin and the second cabin.

7. A method for operating a motor vehicle, comprising the steps of:

receiving a first cabin for the motor vehicle by a single common receiving device that is disposed on a planar upper surface of a drive base device of the motor vehicle such that the first cabin is disposed on the single common receiving device and not in contact with the planar upper support surface of the drive base device, wherein the single common receiving device is a planar structure; and receiving a second cabin for the motor vehicle by the single common receiving device, wherein the second cabin is formed separately from the first cabin and wherein the first cabin and the second cabin are each flexibly laterally and longitudinally arrangeable on the single common receiving device and are disposed laterally adjacent to one another on the motor vehicle.

8. The method according to claim 7, wherein the first cabin and the second cabin are of different configurations.

9. The method according to claim 7, further comprising the steps of:

receiving a third cabin and a fourth cabin for the motor vehicle by the single common receiving device, wherein the third cabin and the fourth cabin are formed separately from the first cabin and the second cabin and wherein the third cabin and the fourth cabin are disposed longitudinally behind the first cabin and the second cabin.

* * * * *